H. S. DICKINSON.
LISTER CULTIVATOR.
APPLICATION FILED JAN. 21, 1916.

1,289,411.

Patented Dec. 31, 1918.
5 SHEETS—SHEET 3.

Attest:

Inventor:
N. S. Dickinson
by Rogers, Kenney & Campbell
Attys.

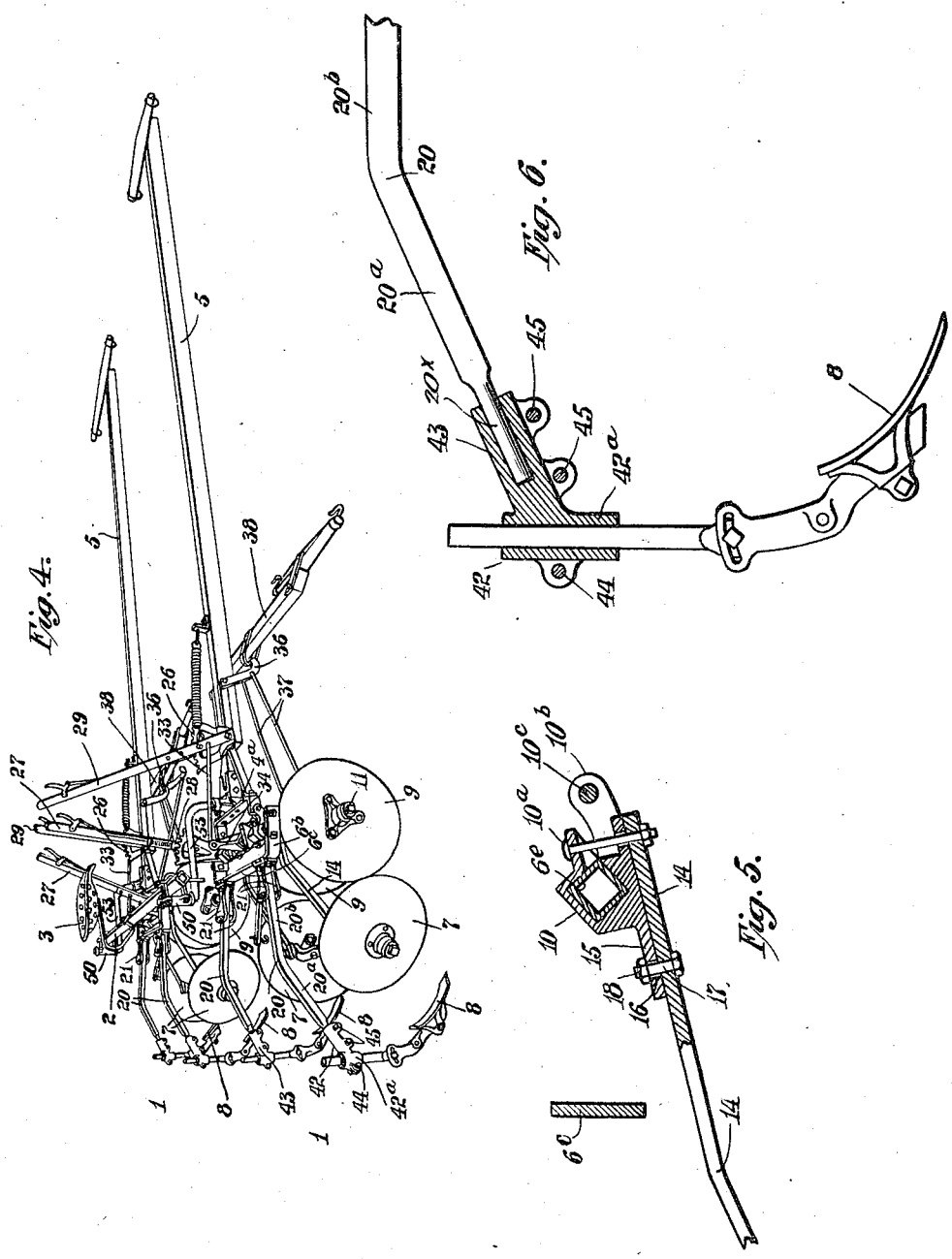

H. S. DICKINSON.
LISTER CULTIVATOR.
APPLICATION FILED JAN. 21, 1916.
1,289,411.
Patented Dec. 31, 1918.
5 SHEETS—SHEET 5.
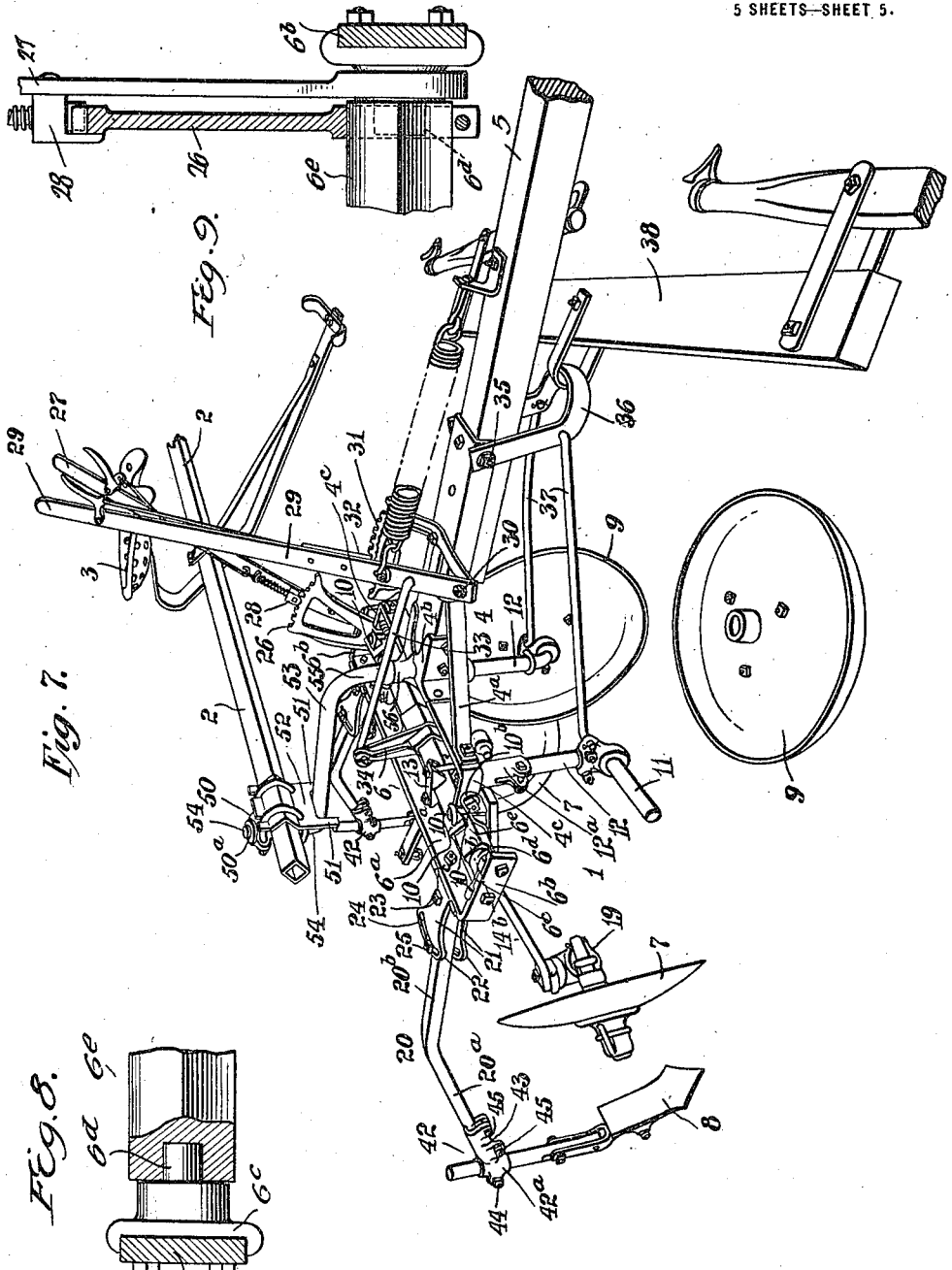
Attest:
Inventor:
H. S. Dickinson
by Rogers, Kennedy & Campbell
Attys

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

LISTER-CULTIVATOR.

1,289,411. Specification of Letters Patent. Patented Dec. 31, 1918.

Application filed January 21, 1916. Serial No. 73,290.

*To all whom it may concern:*

Be it known that I, HARRY S. DICKINSON, a citizen of the United States, residing at Moline, in the county of Rock Island and State of Illinois, have invented certain new and useful Improvements in Lister-Cultivators, of which the following is a specification, reference being had therein to the accompanying drawing.

This invention relates to lister cultivators designed more particularly for the cultivation of young corn, and has reference especially to that type of machine embodying a frame supported by ground wheels and equipped with cultivating disks adapted to be set to throw the soil either inwardly toward, or outwardly from, the row of plants, and cultivating shovels acting to cultivate the ground at the sides of the rows.

Cultivators of this type are commonly constructed to cultivate two rows at one operation, and are known as "two-row" cultivators, and consist of two cultivating units or frames embodying the characteristics above mentioned, which are connected by a transversely extending horizontal connecting bar sustaining the driver's seat, and connected in such manner to the cultivating units as to admit of movement of the same relatively to each other.

My invention consists in various improvements in the form and construction of the individual cultivating units; also in the improved form of drop device adapted to apply the pull of the draft animals in the most favorable direction for effective action; and also in a seat bar of improved form for connecting the cultivating units in operative relations.

The invention consists also in the details of construction and combinations of parts hereinafter described and claimed.

In the accompanying drawings:

Fig. 4 is a side perspective view of the machine.

Fig. 5 is a vertical sectional elevation on an enlarged scale on the line $a$—$a$ of Fig. 1, through one of the clamping clips for the disk bars, and adjacent parts.

Fig. 6 is a vertical sectional elevation on an enlarged scale through one of the clamping heads for the shovel standards.

Fig. 7 is a perspective view on an enlarged scale of one of the cultivating units, the near ground wheel being removed to expose other parts to view.

Fig. 8 is a vertical transverse sectional elevation taken on the line $b$—$b$ of Fig. 7.

Fig. 9 is a vertical transverse sectional elevation on the line $c$—$c$ of Fig. 1.

Figure 1:
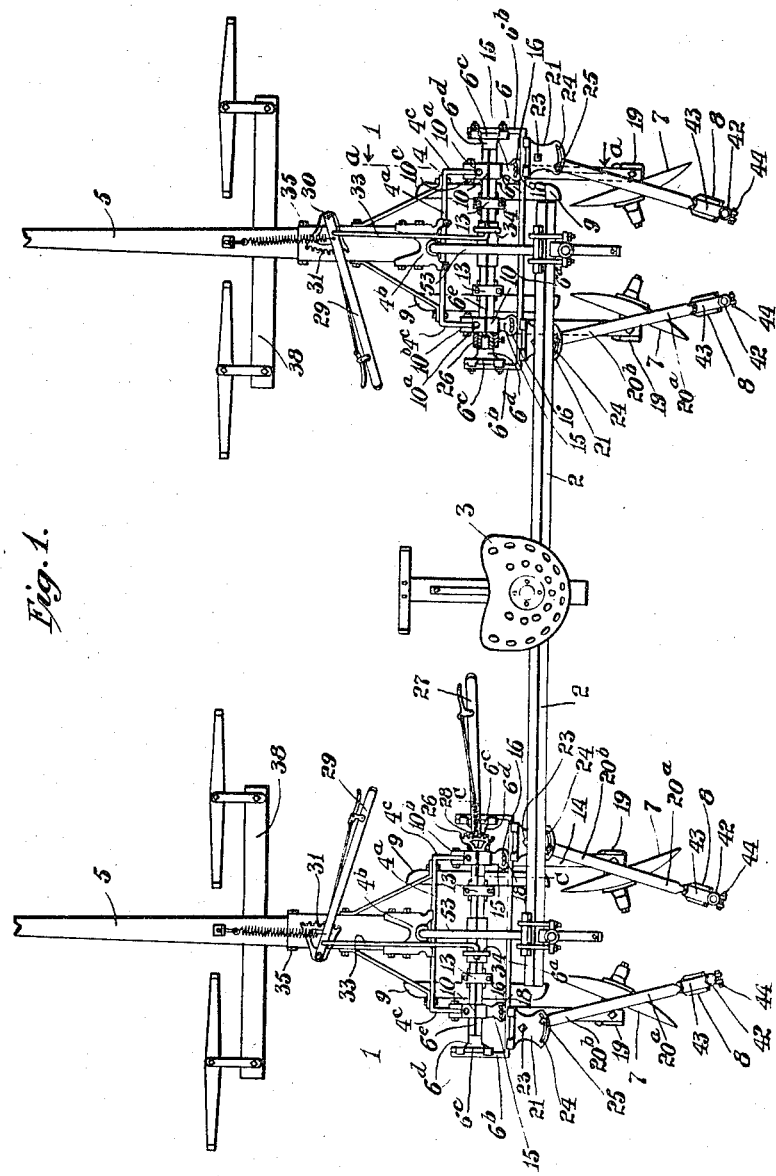
Figure 1 is a top plan view of a lister cultivator having my invention embodied therein, with the disks set to throw the soil outwardly for the first cultivation and with the shovels set close together.

Referring to the drawings:

1, 1, designate two cultivating units which are connected together side by side in operative relations by means of a horizontal transverse connecting bar 2, which is connected to the said units in the manner to be more fully described hereinafter, and which gives support to a driver's seat 3, and inasmuch as the two cultivator units are of the same construction, a description of one will suffice.

Each cultivating unit consists of a main frame comprising a front frame structure 4 connected fixedly to a draft tongue 5, and a rear frame structure 6 which is pivotally connected with the front frame structure on a horizontal transverse axis so that it may be moved up and down relatively thereto, and which gives support to the cultivating devices, in the present instance a pair of cultivating disks 7 and a pair of cultivating shovels 8, the said frame being supported by ground wheels 9 connected to the rear frame structure 6.

The front frame structure 4 is in the form of a horizontal transversely extending frame bar $4^a$ rigidly connected to the rear end of the draft tongue by means of a connecting bracket or casting $4^b$, which frame bar $4^a$ extends at its ends rearwardly in the form of two fore and aft arms $4^c$.

The rear frame structure 6 consists of a horizontal transversely extending frame member $6^a$, the ends of which extend forwardly in the form of fore and aft extending arms $6^b$, to the inner sides of which arms are firmly attached, bracket plates $6^c$ provided each with an inwardly extending journal 6ᵈ. These journals extend loosely in bearing openings in the opposite ends of a transverse horizontally extending frame bar 6ᵉ constituting a part of the rear frame structure 6, which bar is preferably square in cross section, the arrangement being such that said bar may be rocked on its axis relatively to the arms 6ᵇ for the purpose presently to be described. The rear frame structure 6 comprising the frame member 6ᵃ, the transverse frame bar 6ᵉ is pivotally connected with the front frame structure 4 in the present instance by means of two clamping clips 10 see Fig. 5 which embrace the squared frame bar 6ᵉ at opposite sides of its center and which are firmly and rigidly clamped thereto by means of clamping bolts 10ᵃ. Each clamping clip is provided at its front with a pair of ears 10ᵇ between which the rear ends of the arms 4ᶜ of the front frame structure extend, the parts being connected together by pivot bolts 10ᶜ which extend through the ears and arms and thus pivotally connect them together, and consequently pivotally connect the front and rear frame structures together.

The ground wheels 9 before alluded to are rotatably mounted on horizontal outwardly extending wheel journals 11 on the lower ends of upright wheel stems 12 adjustable up and down in depending sockets 12ᵃ whose upper ends are firmly clamped to the square frame bar 6ᵉ of the rear frame structure by means of clamping clips 13 so that when the clips are loosened the wheel stems may be adjusted longitudinally along the bar to correspondingly adjust the ground wheels.

Figure 3:
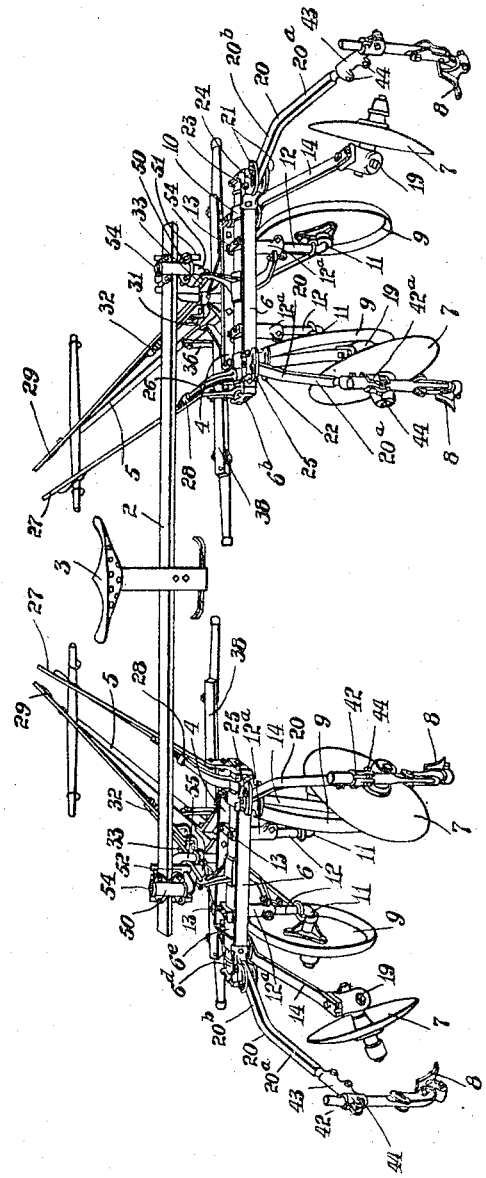
Fig. 3 is a rear perspective view showing the disks set to throw the soil inwardly and the shovels widely separated for the second cultivation.

The cultivating disks 7 before alluded to are adjustably connected, in the manner to be more fully described hereinafter, to the rear ends of arms 14 which extend forwardly and upwardly and are pivotally connected at their forward ends for horizontal adjustment to the under sides of the clamping clips 10 by means of the clamping bolts 10ᵃ before alluded to. These arms 14 are adapted to be swung horizontally on the axis of the bolts 10ᵃ, inwardly and outwardly to adjust the disks nearer to each other or farther apart and are adapted to be firmly held in the required adjusted position. In the present instance this is effected by means of supporting plates 15 see Fig. 5 which extend rearwardly from the clamping clips 10 and against the under sides of which the arms 14 bear. The supporting plates are provided with curved slots 16 extending in an arc whose axis is coincident with the axis of the clamping bolt 10ᵃ, and extending in the slots are fastening bolts 17 which extend also through the arms 14, nuts 18 being applied to the bolts and bearing against the upper sides of the plates 15 and serving to clamp the arms firmly to the plates in the different positions of adjustment on their pivotal axes. The connection of the disk arms to the frame in this manner permits the disks to be adjusted close together as shown in Fig. 1, or more widely separated as shown in Fig. 3, or at intermediate points between the extreme adjustments. The disks are rotatably mounted on supporting heads 19 which are adjustably connected with the rear ends of the arms 14 in such manner that the heads may be reversed in position on the arms in order to either set the disks with their convex sides facing each other so that the disks will throw the soil outwardly, as shown in Fig. 1, or with their concave sides facing each other so that they will throw inwardly as shown in Figs. 3 and 7.

The cultivator shovels 8 are adjustably connected, in the manner presently to be described, to the rear ends of shovel beams 20 which extend forwardly at an upward inclination for a portion of their length as at 20ᵃ, and then horizontally as at 20ᵇ for the remainder of their length, and have their forward ends connected with the horizontal transverse frame member 6ᵃ of the rear frame structure in such manner that the beams may be swung inwardly and outwardly respectively to and from each other to correspondingly adjust the shovels, and may be firmly held in their adjusted position. In the present instance this connection of the beams is effected by means of connecting heads 21 bolted to the rear side of the frame member respectively adjacent its outer ends, and provided each with upper and lower rearwardly extending ears 22, between which the forward ends of the beams extend and to which they are pivoted by means of vertical pivot bolts 23 extending through the ears and the ends of the beams. The ears are provided with arcuate registering slots 24 through which extend clamping bolts 25 which extend also through the respective beams and serve to rigidly hold the beams in the particular position to which they may be adjusted around the pivot bolts 23. As a result of this method of attachment of the shovel beams, the shovels may be adjusted close together so that they will act adjacent the plants as shown in Fig. 1, or they may be widely separated so that they will act farther from the plants as shown in Fig. 3, or they may be adjusted at intermediate points.

From the foregoing description it will be seen that the cultivating devices are all sustained by the rear frame structure 6 which frame structure is movable as an entirety up and down relatively to the forward frame structure 4 on the horizontal pivot bolts 10ᶜ as an axis, means being provided, as will now be described, to normally prevent the relative movement of the squared frame bar 6ᵉ on the journals 6ᵈ, but admitting of such relative movement in order to effect the adjustment of the shovels up and down relatively to the disks. The connection of these parts to effect this action is in the form of a toothed segment frame 26 firmly fixed to the inner end of the bar 6ᵉ, with which frame coöperates an adjusting lever 27 firmly connected fixedly with the inner journal block 6ᶜ. The lever is provided with a locking latch 28 adapted to engage the teeth on the segment frame, and when so engaged, it acts to lock the squared frame bar 6ᵉ in fixed relation to the frame member 6ᵃ, in which position of the parts the frame member 6ᵃ carrying the cultivating shovels, and the squared frame bar 6ᵉ carrying the wheels and disks, will form in effect a unitary structure capable of bodily movement up and down on the pivot bolts 10ᶜ, relatively to the front frame structure 4 fixed to the draft tongue. By unlocking the adjusting lever from the segment frame, the rear frame member may be rocked by the lever on the axis of the frame bar 6ᵉ as a center, which will raise or lower the shovels carried by the frame member 6ᵃ relatively to the disks carried by the frame bar 6ᵉ and the shovels may be held in their adjusted position by again locking the lever to the segment frame.

The up and down movements of the rear frame structure in order to raise and lower the cultivating devices both the shovels and disks out of and into action when the machaine is turned at the ends of the rows or when it is being transported or for other purpose, is effected by means of a hand lever 29 pivoted at its lower end as at 30 to a downward extension of an upright toothed segment frame 31 firmly fixed to the draft pole, the lever being provided with a locking latch 32 adapted to engage the teeth on the segment frame so as to lock it in different positions thereon. Adjacent the pivotal axis of the lever there is jointed to it the forward end of a link 33 whose rear end is jointed to the upper end of an arm 34 firmly fixed at its lower end to the squared frame bar 6ᵉ of the rear frame structure. Normally the lever 29 extends at a slight inclination rearwardly as shown in Fig. 4 in which position of the parts the rear frame structure 6 is in its lower position with both the shovels and disks in action. When the lever is swung forwardly to elevate the cultivating devices, the squared frame member 6ᵉ will be rocked clock-wise on the bolts 10ᶜ as an axis, and the bar 6ᵉ being locked to the bar 6ᵃ by the lever 27 the rear frame structure will be swung upwardly about said axis relatively to the draft pole and forward frame structure, which action will elevate the disks and shovels out of action, and at the same time will swing the carrying wheels rearwardly, to a position where the wheels will balance and support the parts. As a result, the weight of these parts will not be imposed on the neck yokes and the draft animals will consequently be relieved of the same.

I deem this method of connection of the lever 29 with the rear pivotal frame structure as of especial importance and advantage, in that the connection between the parts is a direct one and independent of the draft devices through which the draft is applied to the machine.

It will be seen from the foregoing description that when the lever 29 is locked to its segment frame, the squared frame member 6ᵉ will be held, through its connection with the locked lever, in fixed relation thereto. With the parts in this position, lever 27 may be operated as before described, to rock the frame member 6ᵃ carrying the shovels, relatively to the squared frame bar 6ᵉ carrying the disks and wheels, with the result that the shovels may be given an adjustment independently of the disks and may be elevated out of action independently of the disks.

The draft is applied to the machine by the means shown more particularly in Fig. 7, where it will be seen that there is pivoted to the tongue on a horizontal transverse pivot bolt 35, the upper ends of the vertical arms of a U-shaped draft yoke 36 so that the yoke may swing fore and aft relatively to the pole. The arms of the yoke have jointed to them some distance below their pivotal axis, the forward ends of draft links 37 which extend rearwardly and downwardly and have their rear ends jointed to the respective wheel stems 12 adjacent the wheel journals. A double tree 38 is linked to the draft yoke and carries the usual swingle trees for the attachment of the draft animals. From the construction described it will be seen that the pull of the draft is transmitted directly to the wheel stems adjacent the axis of the wheels through the medium of the links 37, the pivoting of the draft yoke 36 being necessary in order to permit of the rearward movement of the wheel stems when the rear frame structure carrying these stems is adjusted as described, to raise the cultivating devices out of action, the draft yoke in these adjustments swinging on its pivotal axis back and forth on the draft tongue. Also it is to be noted that the swinging draft yoke is free to adapt itself to any position whether the wheels are in a forward or rearward position, and that the directness of the pull exerted through the parts, and the efficiency of the same is not in any way affected by the position of the adjusting lever 29.

Figure 2:
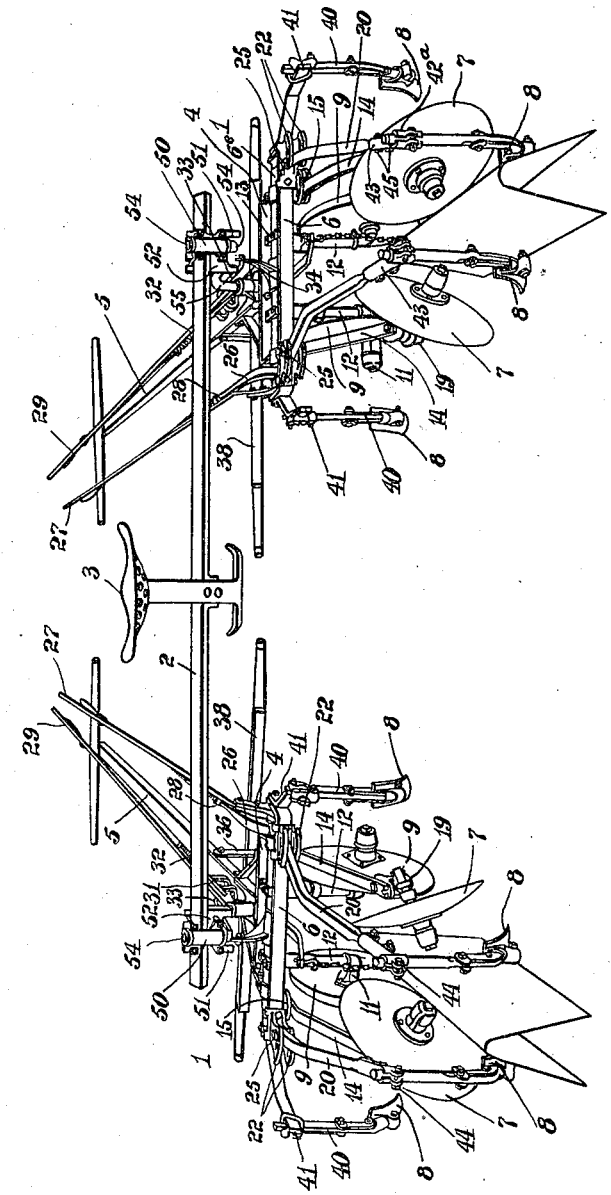
Fig. 2 is a rear perspective view of the same, showing fenders for protecting the plants.

I propose to provide for the use of two additional shovels in connection with the cultivating devices hereinbefore described, these additional shovels in a two-row machine constituting what is known as an "eight-shovel" attachment. These additional shovels, two of which are shown more particularly in Fig. 2, for each cultivating unit, are provided with the usual standards 40 which are connected with the rear ends of horizontally extending shovel bars 41 bolted or otherwise firmly secured at their forward ends either to the outer sides of the arms 6ᵇ or to the inner sides of the same. The length of the shovel bars and their point of connection with the rear frame structure are such that the shovels will be sustained some distance in rear of the pivotal axis of the frame. As a result, when the rear frame structure is elevated for turning or transportation, the shovel points will be raised a greater distance in proportion to the movement of the frame, than if the shovels were sustained closer to the pivotal axis, so that there will be no danger of the shovels encountering obstructions. This is of course true with the main shovels 8 and the disks 7 before alluded to.

The connection of the main shovels 7 with the shovel beams is such that the shovel may be adjusted in different directions relatively to its beam, either up and down relatively thereto, laterally in relation to the beam, or about a vertical axis. These adjustments are important, more particularly that about a vertical axis, because it enables the shovel to be maintained squarely in line with the draft under all conditions of the swinging or lateral adjustment of the shovel beam about its forward vertical axis. To effect these adjustments I provide as shown more particularly in Fig. 6 a socket member or clamp 42 having a vertical socket member 42ᵃ to receive the vertical rounded shovel standard, and having projecting at an upward inclination therefrom, an inclined socket member 43 to receive the rear inclined rounded end of the shovel beam, the said members being adapted to be clamped firmly to the parts by means of clamping bolts 44 for the vertical socket member, and clamping bolts 45 for the inclined socket member. By this means, the shovel standard may be adjusted vertically within the vertical socket member, or may be rotated therein about the vertical longitudinal axis of the standard. Also the clamping head may be adjusted bodily rotatably on the rear end of the shovel beam.

The transverse seat bar 2 before alluded to, is in the present instance in the form of a square pipe sustaining near its middle portion the seat 3, and having fixedly connected to it near its outer ends, heads 50, provided each with a vertical bearing opening 50ᵃ therein, and with two depending spaced stop lugs 51 extending between which is a horizontal supporting surface 52. Two crank arms 53 are provided, each having on one end an upper vertical crank 54 and its other end a lower vertical crank 55. The upper cranks 54 are mounted respectively in the vertical bearing openings in the heads 50, while the lower cranks 55 are mounted respectively in vertical sockets 56 formed in the castings 4ᵇ before alluded to as connecting the rear end of the tongues with the forward frame structure 4. The upper cranks are disposed rearwardly of the lower cranks, the horizontal connecting portions or arms 53 extending between the stop lugs 51 and engaging beneath the horizontal supporting surfaces 52 between said lugs. This method of the connection of the seat bar with the two cultivating units or frames forms a flexible connection between said parts, permitting the units to move relatively to each other forwardly and backwardly, and permitting them to move also to and from each other, the cranks in these movements turning in the bearings in the heads 50 and sockets 56 respectively. The lateral relative motions of the parts are limited by the stop lugs 51 on the heads engaging the horizontal portions 53 of the crank arms.

It will be understood of course that the various improved features of construction hereinbefore described are not limited in their application to the "two-row" form of machine shown in the drawings, but are applicable as well to a single row machine. Further it will be obvious that various changes in the detailed construction of the various parts and their relative form and arrangement may be made without departing from the limits of my invention, the form of parts illustrated being those which I prefer to adopt and which in practice have been found to answer to a satisfactory degree the ends to be attained. Further it will be understood that the invention is not limited to any particular form or construction of the various parts except in so far as such limitations are specified in the claims.

Having thus described my invention, what I claim is:

1. In a lister cultivator, the combination of a front frame structure, a transversely extending frame bar pivoted thereto on a horizontal transverse axis, a rear frame member pivoted to the frame bar on a horizontal transverse axis, a toothed segment frame fixed to the frame bar, an operating lever fixed directly to the frame member and adapted to be releasably locked to the segment frame, cultivating tools sustained respectively by the frame bar and frame member, and means for rocking the frame bar on the axis of its connection with the front frame structure.

2. In a lister cultivator, the combination of a front frame structure provided with rearwardly extending arms, a transverse frame bar pivoted to the arms on a horizontal transverse axis situated in front of the bar, a rear frame member provided with forwardly extending arms pivoted directly to the frame bar on the longitudinal axis of the same, cultivating tools sustained respectively by the frame member and frame bar, releasable means for holding the frame bar and frame member against relative pivotal movement, and means for rocking the frame bar on the axis of its pivotal connection with the rearwardly extending arms of the front frame structure.

3. In a lister cultivator, the combination of a front frame structure, a rear frame structure connected with the front frame structure on a horizontal transverse axis, cultivating tools sustained thereby, a rigid arm on the rear frame structure, an operating lever sustained by the front frame structure and movable fore and aft relatively thereto, and connections between the lever and the arm.

4. In a lister cultivator, the combination of a front frame structure, a rear frame structure including a transverse frame bar pivoted to the front frame structure on a horizontal transverse axis, cultivating tools carried by the rear frame structure, a rigid arm on said transverse bar, an upright lever pivoted to the front frame structure to move fore and aft, and a connecting link pivoted at its rear end to said arm and pivoted at its forward end to said lever at a point above the axis of the latter.

5. In a lister cultivator, the combination of a front frame structure, a rear frame structure pivoted thereto on a horizontal transverse axis and equipped with cultivating tools, a rigid arm on the rear frame structure, a lever mounted on the front frame structure to move back and forth, a connection between the arm and lever, wheel stems fixed at their upper ends to the rear frame structure adjacent its axis, a draft member mounted on the front frame structure to move relatively thereto, and connections between the draft member and wheel stems.

6. In a lister cultivator, the combination of a front frame structure, a transverse frame bar pivoted to said structure on a horizontal transverse axis, cultivating tools sustained by the bar, a rigid arm on the bar, wheel stems fixed at their upper ends to the bar and provided with carrying wheels, a lever pivoted to the frame structure to move back and forth relatively thereto, a link connecting the lever with the arm, a draft member pivoted to the front frame structure to swing back and forth and adapted for the attachment of the draft power, and links connecting said draft member with the wheel stems.

7. In a lister cultivator, the combination of a front frame structure, a rear frame structure pivoted thereto on a horizontal transverse axis, cultivating tools sustained by said rear frame structure, wheel stems also sustained by said rear frame structure and provided with carrying wheels, a draft member movable on the front frame structure and operatively connected with the wheel stems, and a lever mechanism sustained by the front frame structure and operatively connected with the rear frame structure independently of the draft connections, for rocking the rear frame structure to raise and lower the cultivating tools.

8. In a lister cultivator, the combination of a front frame structure, a rear frame structure pivoted thereto on a horizontal transverse axis and equipped with cultivating tools, upright wheel stems connected at their upper ends to the rear frame structure and provided with carrying wheels, a draft yoke pivoted at its upper end to the front frame structure to swing back and forth at its lower end, links connected with the draft member below its pivotal axis and connected also with the wheel stems, and means independent of the wheel stems for rocking the rear frame structure on its axis to raise and lower the cultivating tools.

9. In a lister cultivator, the combination of a front frame structure, a rear frame structure comprising a front frame bar pivoted to the front frame structure on a horizontal transverse axis, and a rear frame member pivoted to the frame bar on a horizontal transverse axis, means for holding the frame member and frame bar normally in fixed relations, said means being operable to rock the frame member on its pivotal connection with the frame bar, cultivating devices sustained respectively by the frame bar and frame member, wheel stems fixed to the frame bar and equipped with carrying wheels, a lever mechanism on the front frame structure operatively connected with the frame bar independent of the wheel stems for rocking the same on its axis relatively to the front frame structure, a swinging draft member mounted on the front frame structure, and links connecting said draft member with the wheel stem.

10. In a lister cultivator, the combination of a front frame structure, a transverse frame bar, clamping clips on said bar pivoted to the front frame structure on horizontal transverse axes, rearwardly extending disk arms pivoted at their forward ends to said clamping clips to swing laterally, means for holding said disk arms in different positions of lateral adjustment, and means for rocking the frame bar on its axis.

11. In a lister cultivator, the combination of two cultivator frames equipped with cultivating tools, upright crank arms journaled at their forward ends in the respective frames, a transversely extending connecting bar pivoted to the rear ends of said crank arms, and two pairs of stop lugs carried by the connecting bar and coöperating with the respective crank arms to limit the lateral motions of the bar.

12. In a lister cultivator, the combination of two cultivating frames equipped with cultivating tools and provided each with a vertical bearing, a transverse connecting bar provided with two vertical bearings and provided also with two stop lugs associated with each bearing, horizontal arms extending between the stop lugs and provided at their rear ends with upwardly extending cranks mounted in the bearings on the connecting bar, and downwardly extending cranks on the forward ends of said arms mounted in the bearings on the cultivator frames.

In testimony whereof, I have affixed my signature.

HARRY S. DICKINSON.

Copies of this patent may be obtained for five cents each, by addressing the "Commissioner of Patents, Washington, D. C."